United States Patent [19]

Stroup et al.

[11] 4,190,407

[45] Feb. 26, 1980

[54] APPARATUS FOR FILLING HEATING TUBE

[75] Inventors: Steven L. Stroup, Lancaster Township, Wells County; Galen B. Harman, La Grange, both of Ind.

[73] Assignee: Burr Oak Tool & Gauge Company, Sturgis, Mich.

[21] Appl. No.: 919,422

[22] Filed: Jun. 26, 1978

[51] Int. Cl.[2] .......... A23G 1/20

[52] U.S. Cl. .......... 425/110

[58] Field of Search .......... 425/110; 29/745

[56] References Cited

U.S. PATENT DOCUMENTS

| | | | |
|---|---|---|---|
| 2,973,572 | 3/1961 | Oakley | 29/745 |
| 3,277,531 | 10/1966 | Boggs | 425/110 |
| 3,366,723 | 1/1968 | Green | 425/110 |

*Primary Examiner*—Robert F. White

*Assistant Examiner*—James R. Hall

*Attorney, Agent, or Firm*—Blanchard, Flynn, Thiel, Boutell & Tanis

[57] ABSTRACT

An apparatus for manufacturing sheathed heating elements, including means for supporting a plurality of sheaths to be filled with a particulate material, means for positioning a plurality of resistive elements individually within the sheaths, a plurality of sets of inner and outer concentric filling tubes defining an annular filler passage therebetween for the material, means for positioning the plurality of sets of concentric filling tubes within the sheaths in surrounding relationship to the resistance elements, means for feeding the material through the passage as the tubes are withdrawn from the sheath so as to concentrically position each resistance element within its respective sheath and to fill the sheath from the bottom thereof with the material, and valve means for controlling the feeding of the material through the passage. The valve means is directly associated with the inner and outer concentric tubes and is movable between a first opened position permitting flow through the passage into the sheath and a second closed position for positively preventing flow from the passage into the sheath. The valve means includes a valve member positioned adjacent the lower ends of the tubes and movable relative to at least one of the tubes between said opened and closed positions.

9 Claims, 22 Drawing Figures

FIG. 7
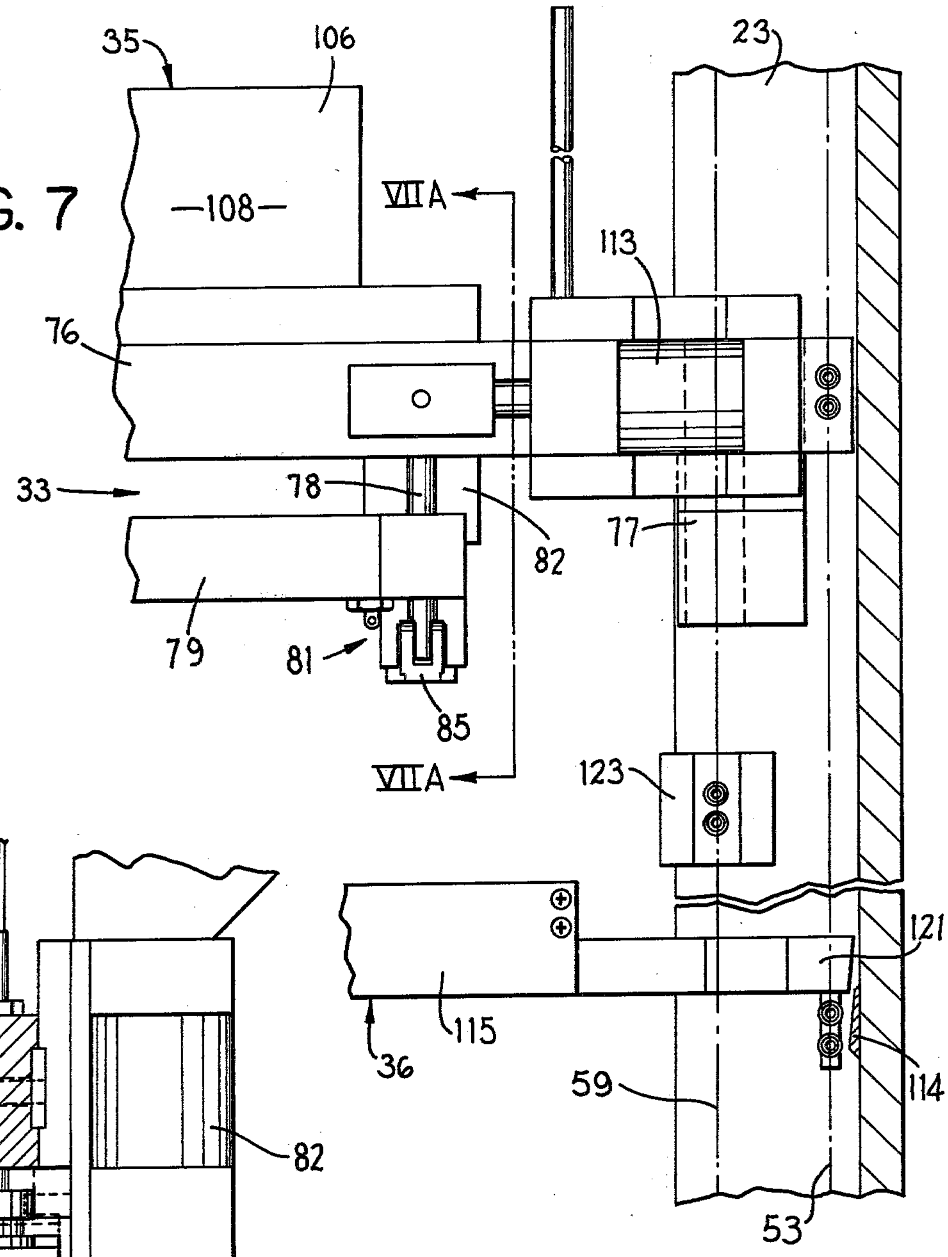
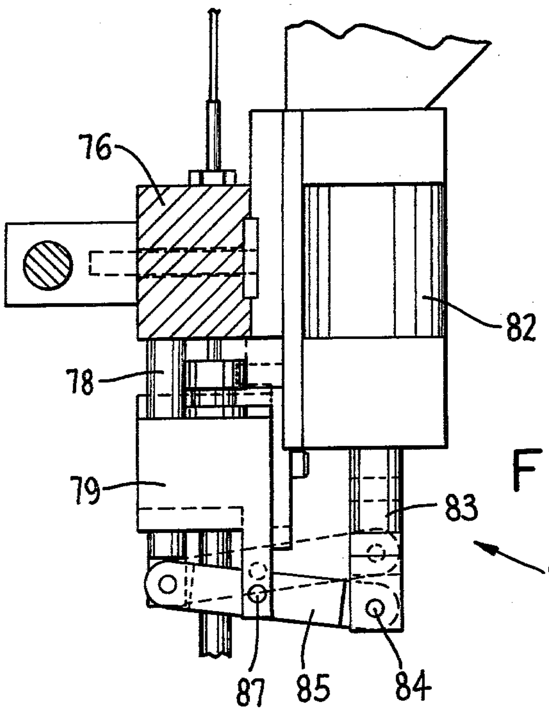
FIG. 7A 71
72
73
74
76
79
93
94
96
97
101
111
118
10
11
12
13
14
15
16
17
18
36
37
39
155
156
157

APPARATUS FOR FILLING HEATING TUBE

FIELD OF THE INVENTION

This invention relates to an apparatus for manufacturing sheathed electrical heating elements, such as utilized in electric ranges and the like.

BACKGROUND OF THE INVENTION

Electrical heating units of the sheathed type have been extensively utilized from many years. In units of this type, a resistance-type conductor is enclosed by a metal sheath and embedded in a compacted mass of granular insulating material, such as magnesium oxide. The ends of the sheath are closed in any suitable way, as by swaging or rolling. The terminals formed by the ends of the conductor project out from the sheath so that suitable external electrical connection can be made thereto. Such sheathed heating units are utilized in a large variety of electrical appliances, such as ranges, cooking devices and the like.

Such sheathed heating elements have long presented a manufacturing problem in that automating the manufacturing technique to permit efficient mass production has met with limited and questionable success. Thus, sheathed heating elements are still manufactured by techniques which involve a large number of manual operations. This makes the manufacturing of these elements expensive, and results in greater manufacturing variations in the finished elements.

In an attempt to at least partially automate the manufacture of sheathed heating elements, so as to both permit the mass manufacture of same while maintaining a more uniform construction, there has been developed the apparatus disclosed in U.S. Pat. No. 2,973,572 issued to S. A. Oakley. While the Oakley apparatus does permit a substantial improvement in the manufacture of sheathed heating elements, nevertheless this apparatus also possesses features which have been less than optimum. For example, it is desirable to fill and manufacture such sheathed elements at a rate greater than that permitted by the Oakley apparatus, and it is also desirable to provide an improved apparatus which permits handling of the components of the sheathed heating element in a different manner to permit a more efficient and simpler manufacturing process.

Accordingly, it is an object of the present invention to provide an apparatus for permitting the manufacture of sheathed electrical heating elements, which apparatus permits the mass production of such elements by means which can be more fully automated so that the production rate and efficiency can be substantially increased, while at the same time permitting heating elements to be manufactured with a high degree of consistency and uniformity.

It is also an object of this invention to provide an apparatus, as aforesaid, which utilizes an improved filling tube structure to facilitate the insertion and centering of the resistance conductor within the sheath, and which filling tube structure has an improved valve structure associated therewith to permit a more rapid filling of the sheath with insulating material.

Other objects and purposes of the invention will be apparent to persons familiar with apparatuses of this general type upon reading the following specification and inspecting the accompanying drawings.

BRIEF DESCRIPTION OF THE DRAWINGS

FIG. 7 illustrates, on an enlarged scale, the braking and valve actuating mechanisms associated with the manifold assembly.

FIG. 7A is a view along line VIIA—VIIA in FIG. 7.

Figure 1:
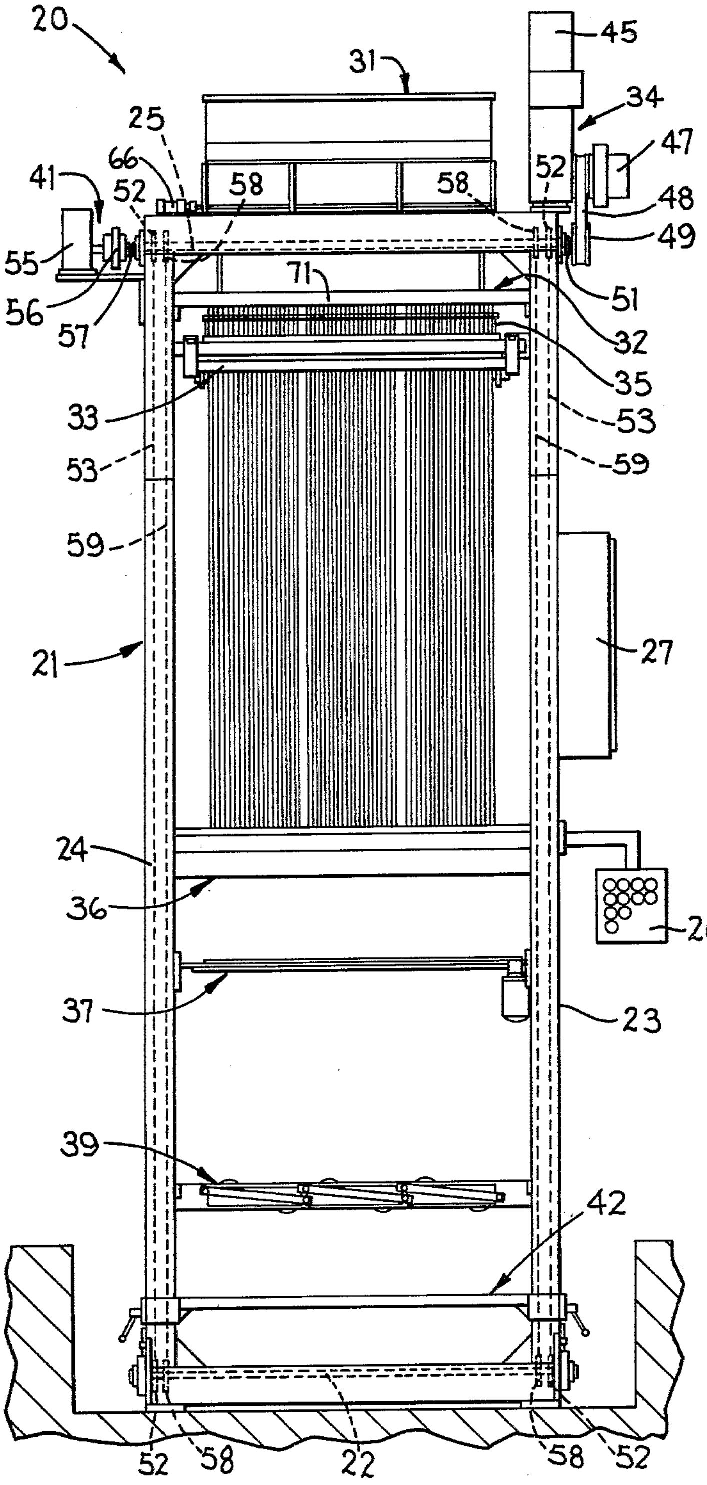
FIG. 1 is a front elevational view of the inventive apparatus.

Certain terminology will be used in the following description for convenience in reference only and will not be limiting. For example, the words "upwardly," "downwardly, " "leftwardly" and "rightwardly" will refer to directions in the drawings to which reference is made. The words "inwardly" and "outwardly" will refer to directions toward and away from , respectively, the geometric center of the apparatus and designated parts thereof. Said terminology will include the words specifically mentioned, derivatives thereof and words of similar import.

SUMMARY OF THE INVENTION

An apparatus for manufacturing sheathed heating elements including means for supporting a plurality of sheaths to be filled with a particulate material, means for positioning a plurality of resistive elements individually within said sheaths, a plurality of sets of inner and outer concentric filling tubes defining an annular filling passage therebetween for said material, means for positioning said plurality of sets of concentric filling tubes within said sheaths in surrounding relationship to said resistance elements, means for feeding the material through said passage as said tubes are withdrawn from said sheath so as to concentrically position each said resistance element within its respective sheath and to fill said sheath from the bottom thereof with said material, and valve means for controlling the feeding of said material through said passage, comprising the improvement wherein said valve means is directly associated with said inner and outer concentric tubes and is movable between a first opened position permitting flow through said passage into said sheath and a second closed position for positively preventing flow from said passage into said sheath, said valve means including a valve member positioned adjacent the lower ends of said tubes and movable relative to at least one of said tubes between said opened and closed positions.

DETAILED DESCRIPTION

Figures 15, 16, 17, 18, 19, 20:
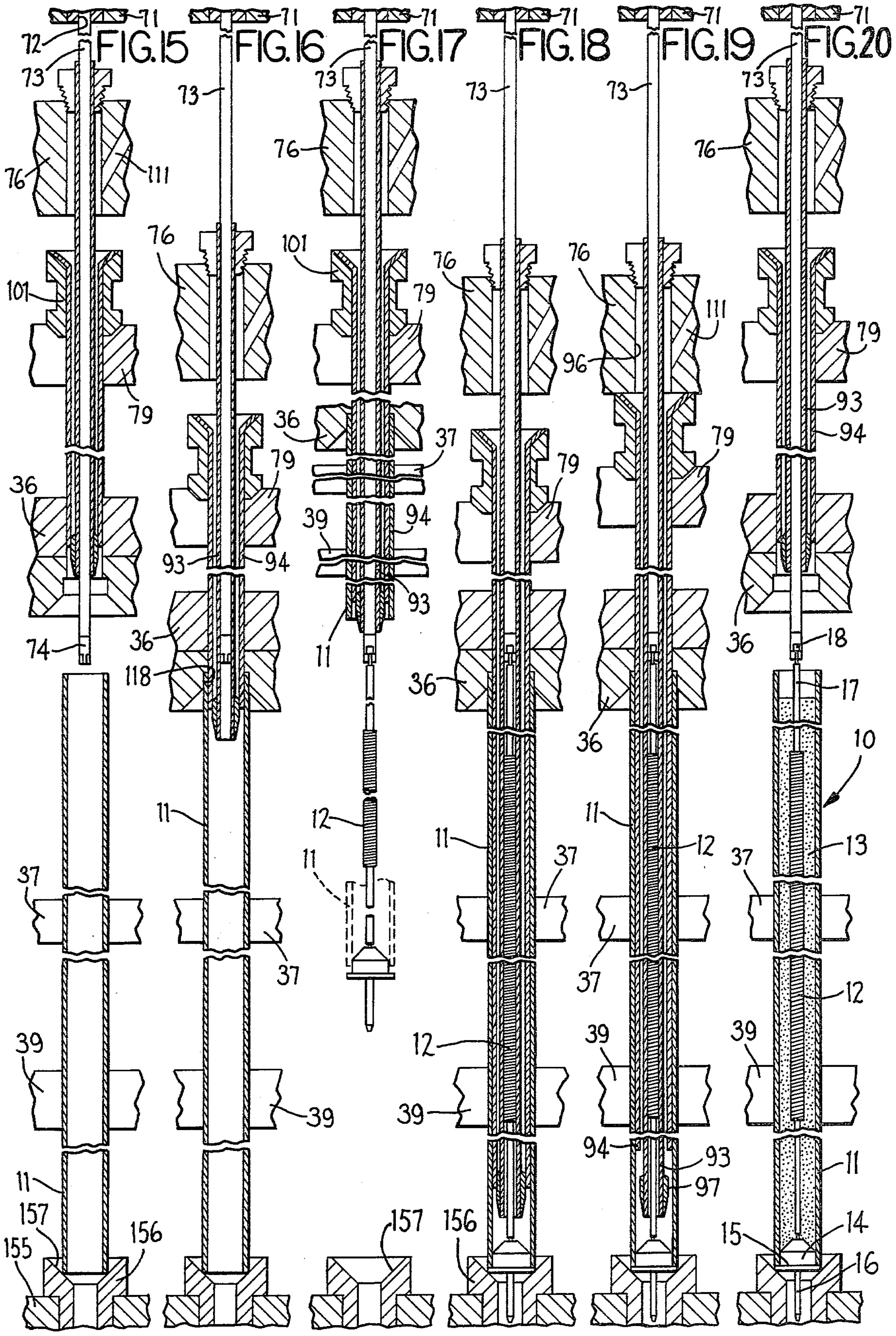
FIGS. 15-20 are fragmentary sectional views illustrating the structural and positional relationships of the filling tubes and associated structures during the sequence of steps which are carried out during a complete cycle of operation.

Referring to the drawings, the apparatus of this invention permits the production of an electrical heating element, such as the element 10 illustrated in FIG. 20. The heating element 10 comprises a tubular sheath 11 formed of any rigid material which will withstand the temperatures to which the heating element is subjected. Centrally disposed within the sheath 11 is a resistance wire or conductor 12, preferably coiled in the form of a helix and formed of any well-known material, such as one of the nickel chromium alloys extensively utilized for this purpose. The space within sheath 11 is filled with a granular material 13 which is preferably a good electrical insulator and at the same time a relatively good heat conductor. Granular magnesium oxide is conventionally utilized for this purpose. A substantially cylindrical plug 14 is fixedly connected to the conductor 12 adjacent the lower end thereof, which plug is snugly received within the sheath 11 and terminates in a lower annular stop flange 15 which abuts against the free end of the sheath. The opposite ends of the conductor are defined by lower and upper projecting portions 16 and 17, respectively, which project outwardly beyond the sheath and are adapted for connection to electrical terminals. The upper projecting portion 17 is provided, adjacent its upper free end, with an annular encircling groove whereby the upper free end thus defines a gripping part 18. The plug 14, while rigidly attached to the lower portion of the conductor, is generally constructed of a plastic material such that, after the swaging or rolling operation and during the annealing operation, the plug volatilizes. The structure of the heating element 10, as described above, is conventional.

To permit forming of the heating element 10, the present invention provides an apparatus 20 (FIGS. 1 and 2) which includes a frame 21 formed by a base 22, a pair of elongated uprights 23–24, and a top cross piece 25. The uprights 23–24 are channel-like members which open inwardly toward one another. An operator's control panel 26 is mounted on the upright 23, and a control box 27 is positioned above the control panel.

The apparatus 20 includes a main hopper assembly 31 adjacent the upper end thereof for containing a quantity of granular insulating material, such as magnesium oxide. A hook rod bar assembly 32 is disposed below top cross piece 25 and extends between and is fixedly connected to the uprights 23–24. A manifold assembly 33 also extends between the uprights and is positioned below the hook rod bar assembly 32. The manifold assembly 33 is movable vertically relative to the uprights, and can be drivingly moved by a drive mechanism 34 disposed adjacent the upper end of the apparatus. A work hopper assembly 35 is associated with the manifold assembly 33, which hopper assembly 35 receives therein granular insulating material from the main hopper assembly 31 and then discharges the material into the sheath as explained hereinafter.

Apparatus 20, as shown in FIG. 1, also includes a tube entry guide bar 36 which is positioned downwardly from the manifold assembly and is disposed between and vertically movable relative to the uprights 23–24. A hammer bar assembly 37, disposed below the tube entry guide bar 36, extends between and is vertically movable relative to the uprights 23–24. A clamp bar assembly 39 is positioned adjacent the lower end of the apparatus and is vertically movably supported relative to the uprights. A clamp bar drive mechanism 41, as provided adjacent the upper end of the frame, is drivingly interconnected to the clamp bar assembly 39 to control the vertical movement thereof. A receiver bar assembly 42 extends between and is fixedly connected to the uprights 23–24 adjacent the lower end of the frame.

The structure of the above-mentioned assemblies and mechanisms will now be described in greater detail.

Drive Mechanisms

The manifold drive mechanism 34 includes a power source 45 such as a combined motor-speed reducer unit, provided with a rotatable output shaft which, acting through a conventional clutch-brake unit 47, drives a belt-drive mechanism 48, the output pulley 49 of which is nonrotatably secured to a drive shaft 51. This shaft 51 extends horizontally across the upper end of frame 21 and is rotatably supported by suitable bearings. A pair of cooperating sprockets 52 is associated with each of the uprights 23–24 with the uppermost sprocket of each pair being nonrotatably secured to the shaft 51, and the lowermost sprocket being rotatably supported adjacent the lower end of the respective upright 23–24. The pairs of sprockets 52 are joined by endless chains 53, one of which extends interiorly along each upright 23–24.

The clamping bar drive mechanism 41 also includes a power source 55, such as a combined motor-speed reducer unit, the output shaft of which is connected through a conventional clutch-brake 56 to one end of an elongated drive shaft 57. This shaft 57 extends horizontally across the top of frame 21 and is rotatably supported by appropriate bearings. Drive shaft 57 extends parallel to drive shaft 51 but is laterally spaced forwardly therefrom. A further pair of identical chain sprockets 58 are associated with each of uprights 23–24, with the uppermost sprocket of each pair being nonrotatably secured to drive shaft 57, whereas the lowermost sprocket is rotatably supported adjacent the lower end of the respective upright. A further pair of endless chains 59 join the sprocket pairs 58, with one of the chains 59 extending vertically through the interior of each upright 23–24.

Main Hopper Assembly

Figure 4:
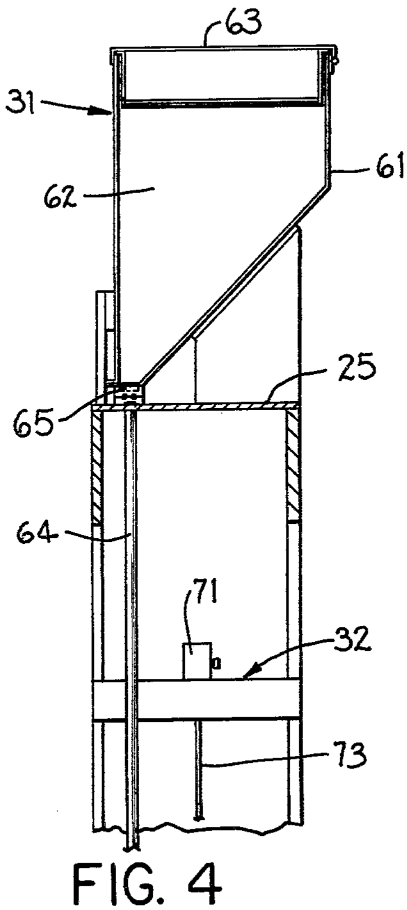
FIG. 4 is a sectional view along line IV—IV in FIG. 3.
Figure 3:
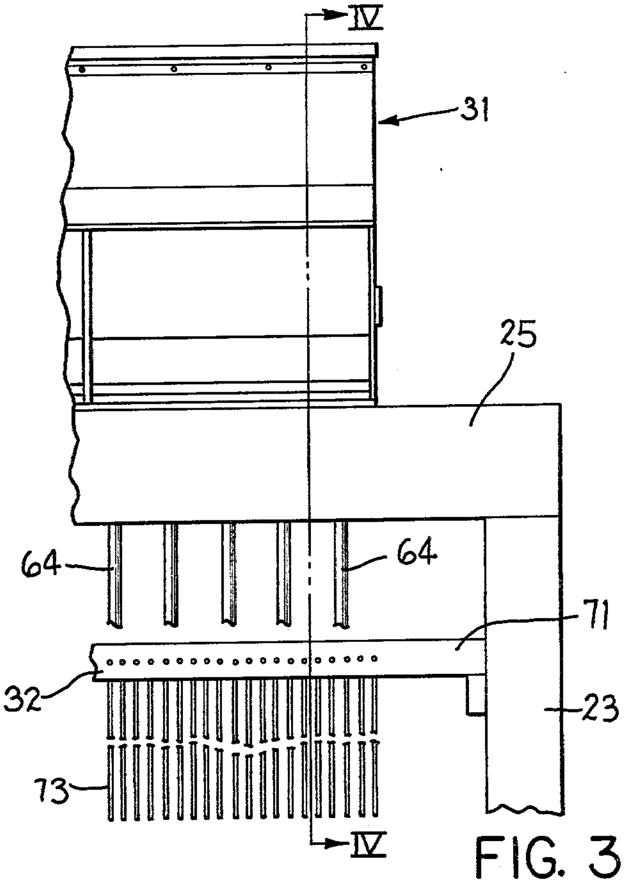
FIG. 3 is an enlarged, fragmentary, front elevational view showing the main hopper assembly and the hook rod assembly.

As illustrated in FIGS. 3 and 4, the main hopper assembly 31 includes a hopper 61 which is fixed to and extends longitudinally along the upper cross piece 25. Hopper 61 defines an interior compartment 62 containing therein granular insulating material. This hopper 61 has a removable top cover 63 to permit filling of the interior compartment. The lower end of the hopper has a plurality of vertically elongated supply tubes 64 fixed thereto, which tubes are disposed in parallel relationship across the width of the apparatus and project vertically downwardly toward the manifold assembly 33. A valve plate 65 is linearly slidably disposed at the bottom of the hopper to control flow therefrom into the tubes 64. The reciprocating movement of valve plate 65 is controlled by a conventional double-acting fluid pressure cylinder 66 (FIG. 1) as mounted on the top cross piece 25.

Hook Rod Bar Assembly

Figure 2:
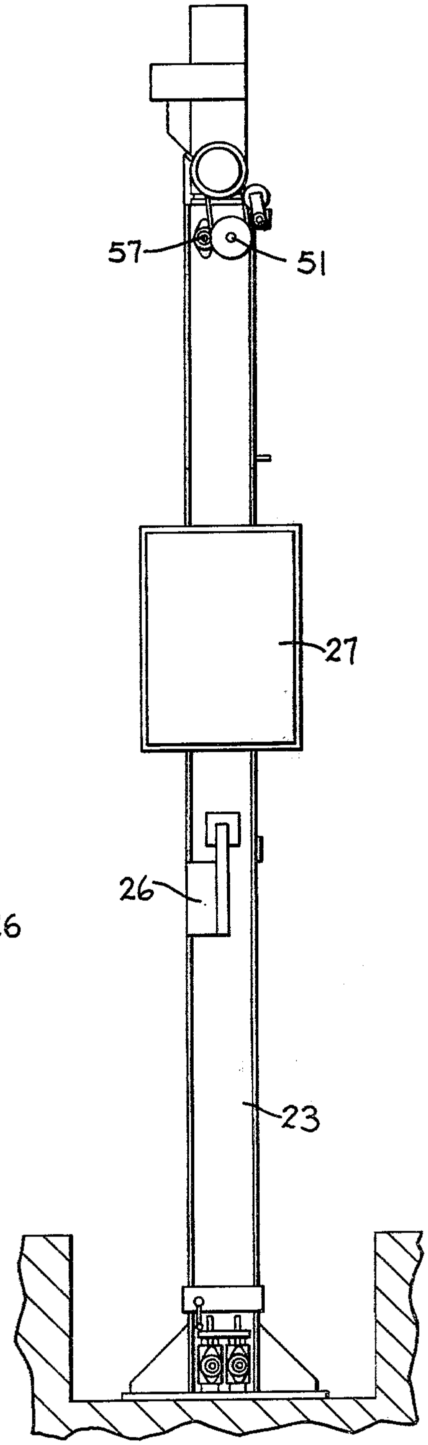
FIG. 2 is a side elevational view of the apparatus.

The hook rod bar assembly 32, as illustrated in FIGS. 2 and 3, comprises an elongated rigid bar 71 which extends horizontally between and has the opposite ends thereof fixed to the uprights 23–24. This bar has a plurality of small diameter openings 72 (FIG. 15) extending vertically therethrough, which openings are disposed within a row which extends in the horizontal longitudinal direction of the bar. A plurality of elongated, cylindrical hook rods 73 are fixedly mounted on the bar 71 and are suspended vertically downwardly therefrom in parallel relationship. These hook rods have the upper ends thereof positioned within the openings 72, with the rods being suitably fixed to the bar 71, as by set screws or the like. The lower end of hook rod 73 is provided with a slotted hook 74 (FIG. 15) designed for engagement with the gripping part 18 of the conductor 12 to permit the latter to be suspended from the hook rod 73 as illustrated in FIG. 17.

Manifold Assembly

Figure 5:
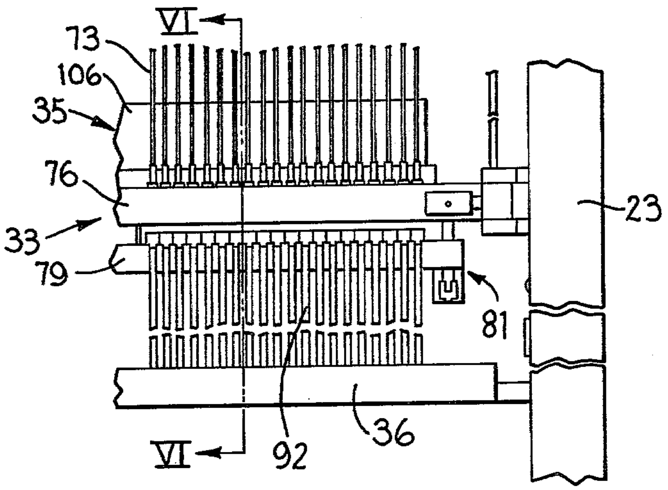
FIG. 5 is an enlarged, fragmentary, front elevational view showing the manifold assembly.
Figure 6:
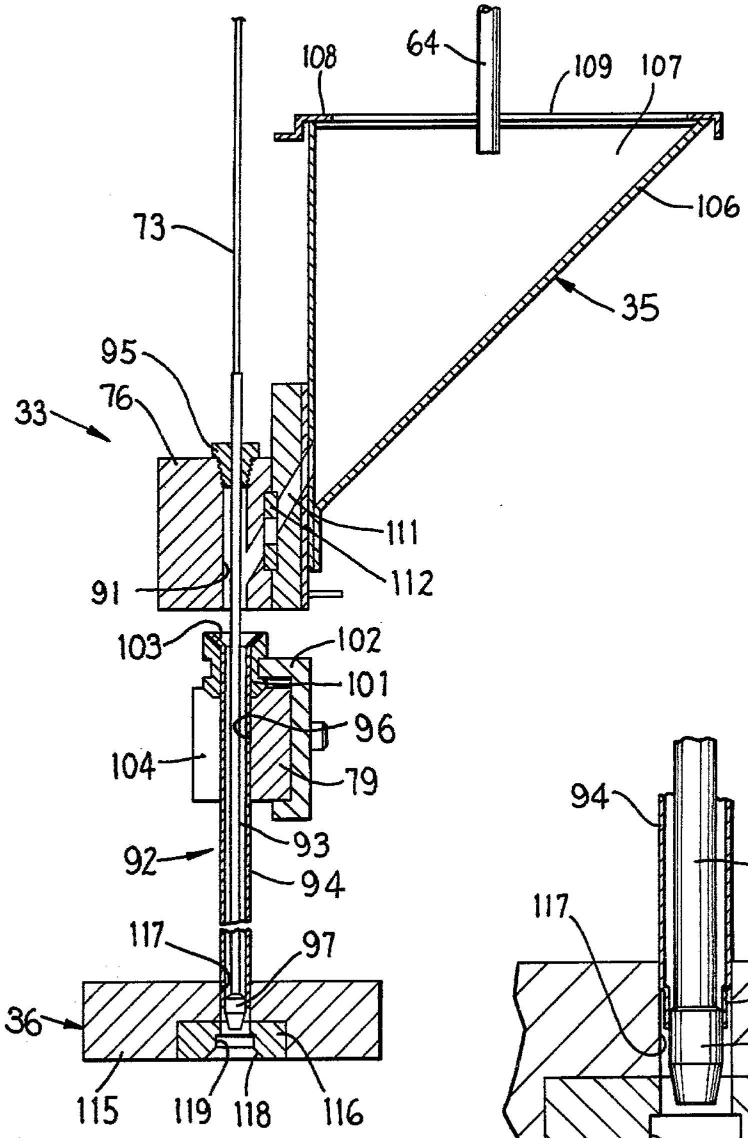
FIG. 6 is a fragmentary sectional view, on an enlarged scale, taken along line VI—VI in FIG. 5.

As illustrated in FIGS. 5–7, the manifold assembly 33 comprises an elongated manifold bar 76 which extends horizontally between the uprights 23–24. The opposite ends of bar 76 are fixed to blocks 77, which in turn are fixed to the chains 53. A pair of valve support rods 78 are fixed to the manifold bar 76, adjacent the opposite ends thereof, and project vertically downwardly therefrom. A horizontally elongated valve block 79 is positioned below the manifold bar 76 in substantially parallel relationship thereto, and is vertically movably supported on the rods 78.

The valve block 79, adjacent at least the ends thereof, is connected to a plurality of substantially identical lifting devices 81, as shown in FIG. 7A. The lifting device 81 includes a conventional double-acting pressure cylinder 82 which is fixed to the manifold bar 76 and has a downwardly projecting piston rod 83 which is pivoted at 84 to an actuating lever 85. This lever 85 in turn has the other end thereof pivoted at 86 to the lower end of the support rod 78. The lever 85 is, intermediate the ends thereof, pivotally connected at 87 to the valve block 79 to cause upward lifting of the valve block when the piston rod 83 is moved upwardly.

The manifold bar 76 has a plurality of openings 91 extending vertically therethrough, which openings are disposed within a row which extends horizontally in the longitudinal direction of the manifold bar, whereby the openings 91 are thus disposed below and in substantial alignment with the openings 72 formed in the hook rod bar 71. Each opening 91 has a filler tube device 92 associated therewith, which device includes concentric inner and outer filler tubes 93 and 94, respectively. The inner filler tube projects slightly upwardly above the manifold bar and is fixed thereto, as by a locking collet 95. The inner filler tube 93 is of substantially smaller diameter than the opening 91, and it projects downwardly through a corresponding opening 96 formed in the valve block. The inner filler tube 93 has, at the lower end thereof, an annular enlargement 97 fixed thereto, which enlargement 97 is of a torpedo-like shape. The enlargement 97 snugly slidably fits within the reduced diameter part 98 at the lower end of outer tube 94 and thus functions as a valve member, and will be so designated hereinafter.

Figure 6A:
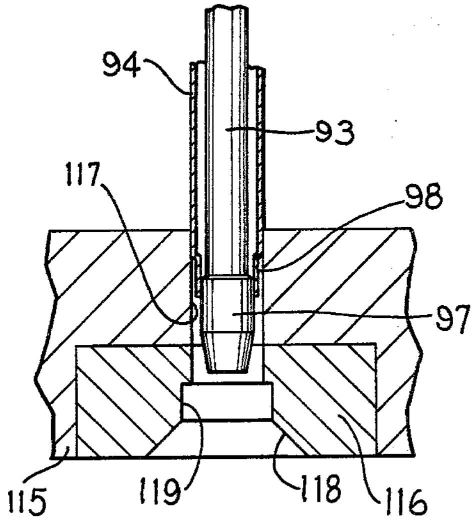
FIG. 6A is an enlarged, fragmentary sectional view of the filling tube valve.

The outer filler tube 94 is fixed to the valve block 79, as by means of a seat member 101, the latter being held to the valve block 79 by a C-clamp 102. Outer tube 94 projects downwardly through the opening 96 and through a substantial axial extent in surrounding relationship to the inner tube 93. The inner diameter of the lower portion 98 of outer filler tube 94 is substantially equal to the maximum diameter of the valve member 97 so that the lower end of the outer filler tube is effectively closed when the valve member is disposed therein, as indicated in FIG. 6A. The outer filler tube 94 has an upper conical sleeve portion 103 which flares outwardly and upwardly, and is seated in the seat member 102. The valve block 79 has a slot 104 which opens frontwardly thereof to permit removal of the outer tube 94 when the C-clamp 102 is removed.

Work Hopper Assembly

As illustrated in FIGS. 5 and 6, the work hopper assembly 36 comprises a horizontally elongated hopper 106 which defines therein a compartment 107 for the granular insulating material. This hopper is fixed to and extends longitudinally along the manifold bar 76. The hopper has a removable top cover 108 which is provided with suitable slots or openings 109 therein and through which project the lower ends of the supply tubes 64 when the manifold assembly is adjacent its uppermost position. The work hopper 106 communicates with the plurality of manifold openings 91 through inclined feed passages 111 as illustrated in FIG. 6. A shut-off bar 112 extends longitudinally of and is slidably supported on the manifold bar, and is associated with the inclined feed passages 111 to permit the selective opening or closing thereof. The shut-off bar is interconnected to a pressure cylinder 113 (FIG. 7) which longitudinally slidably displaces the shut-off bar 112 to thereby open the inclined feed passages 111 whenever the valve block 79 is lifted upwardly by the lifting devices. 81.

Tube Entry Guide Bar

The tube entry guide bar 36, as shown in FIGS. 5 and 6, extends horizontally between the uprights 23–24 and is spaced downwardly a substantial distance below the manifold assembly. The tube entry guide bar 36 is not connected to the chains 53 and 59, and similarly is not fixedly connected to the uprights, whereby the tube entry guide bar can be vertically displaced relative to the frame. The tube entry guide bar is normally maintained in a selected lower position relative to the frame by opposed wedge-like locator elements 114 (FIG. 14) which are fixed to the uprights 23–24 in opposed relationship. These elements engage the ends of the tube entry guide bar and thereby not only center same, but also hold same in a lowermost position relative to the frame.

The guide bar 36, as illustrated in FIG. 6, is preferably formed from a horizontally elongated guide plate 115 in which an elongated insert 116 is fixedly positioned. A plurality of openings 117 extend vertically through the tube entry guide bar substantially in alignment with the openings 96 formed in the valve block 79, whereby the openings 117 are of a diameter so as to snugly yet slidably receive therein the outer filler tubes 94. The insert 116 has a tube guide opening 118 formed therein in concentric relationship to the opening 117, which tube guide opening 118 is of a conical configuration and, as it projects upwardly, flares inwardly so as to terminate in a cylindrical bore 119 which is of a slightly larger diameter than the opening 117. The bore 119 is of a diameter equal to or slightly larger than the outer diameter of the element sheath 11, whereby the upper end of the sheath 11 can be seated within the bore 119 to effectively abut against the shoulder defined at the upper end thereof.

The opposite ends of the tube entry guide bar 36 have lifter blocks 122 fixed thereto in adjacent relationship to the chains 53. The chains 53, as associated with the manifold assembly, also have block-like lifting elements 122 fixed thereto and normally positioned below the lifter blocks 121, whereby the lifting elements are adapted to be moved upwardly into engagement with the lifter blocks 212 to cause limited vertical lifting of the tube entry guide bar, as explained hereinafter.

Hammer Bar Assembly

Figure 8:
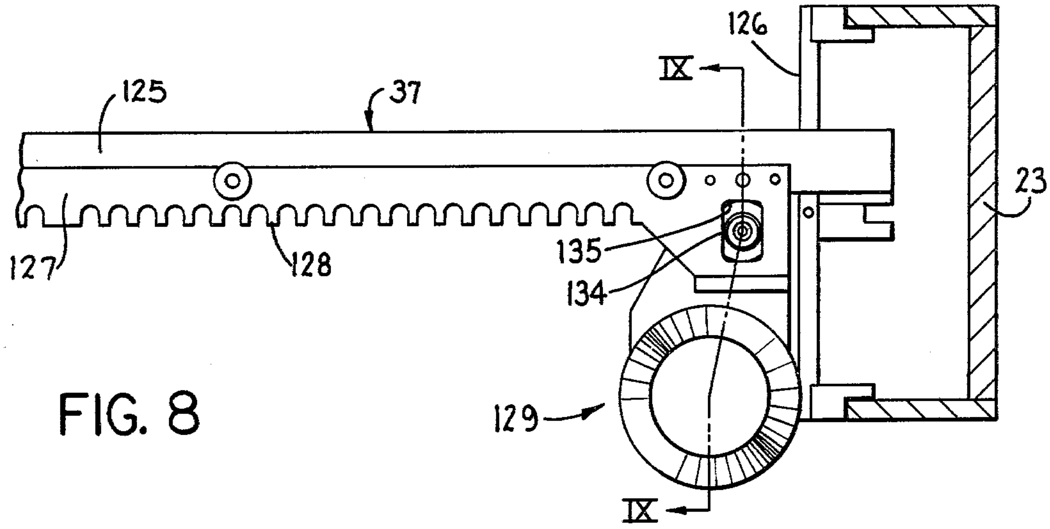
FIG. 8 is an enlarged, fragmentary plan view of the hammer assembly.
Figure 9:
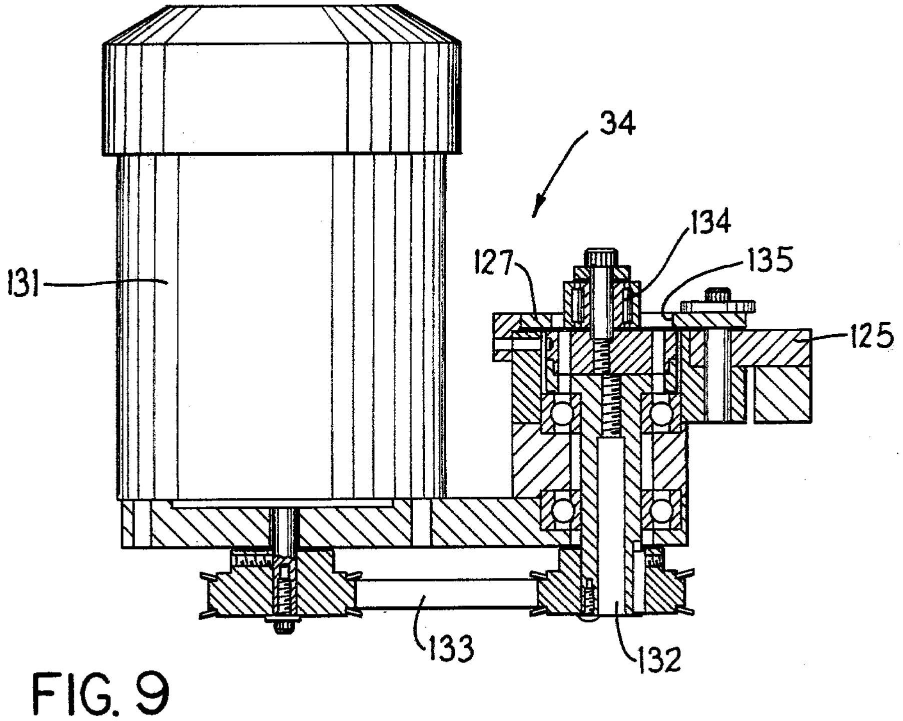
FIG. 9 is an enlarged view, partially in cross-section, of the hammer assembly drive, as taken along line IX—IX in FIG. 8.

Referring to FIGS. 1, 8 and 9, the hammer bar assembly 37 comprises an elongated guide bar 125 which extends horizontally.

The guide bar 36, as illustrated in FIG. 6, is preferably formed from a horizontally elongated guide plate 115 in which an elongated insert 116 is fixedly positioned. A plurality of openings 117 extend vertically through the tube entry guide bar substantially in alignment with the openings 96 formed in the valve block 79, whereby the openings 117 are of a diameter so as to snugly yet slidably receive therein the outer filler tubes 94. The insert 116 has a tube guide opening 118 formed therein in concentric relationship to the opening 118 formed therein in concentric relationship to the opening 117, which tube guide opening 118 is of a conical configuration and, as it projects upwardly, flares inwardly so as to terminate in a cylindrical bore 119 which is of a slightly larger diameter than the opening 117. The bore 119 is of a diameter equal to or slightly larger than the outer diameter of the element sheath 11, whereby the upper end of the sheath 11 can be seated within the bore 119 to effectively abut against the shoulder defined at the upper end thereof.

The opposite ends of the tube entry guide bar 36 have lifter bloack 121 fixed thereto in adjacent relationship to the chains 53. The chains 53, as associated with the manifold assembly, also have block-like lifting elements 122 fixed thereto and normally positioned below the lifter blocks 121, whereby the lifting elements are adapted to be moved upwardly into engagement with the lifter blocks 121 to cause limited vertical lifting of the tube entry guide bar, as explained hereinafter.

Hammer Bar Assembly

Referring to FIGS. 1, 8 and 9, the hammer bar assembly 37 comprises an elongated guide bar 125 which extends horizontally between the uprights 23–24 and has the opposite ends thereof anchored to the chains 59. The opposite ends of guide bar 125 are provided with suitable guides 126 which are vertically slidably engaged with the adjacent uprights 23–24. An elongated hammer bar 127 is slidably supported longitudinally of the guide bar 125, which hammer bar has a plurality of slots 128 formed in one side thereof for accommodating the element sheaths 11. The hammer bar is longitudinally reciprocated through a small distance at a low frequency by a hammer drive mechanism 129 which, as shown in FIG. 4, includes a rotatable drive motor 131 which drives the shaft 132 through the belt transmission 133. This shaft 132 has a crank pin 134 eccentrically mounted thereon, which crank pin is confined within an elongated slot 135 which extends perpendicularly with respect to the hammer bar 127. Rotation of shaft 132 and crank pin 134 causes the hammer bar to reciprocate longitudinally along the guide bar 125, as explained hereinafter.

Clamp Bar Assembly

Figure 11:
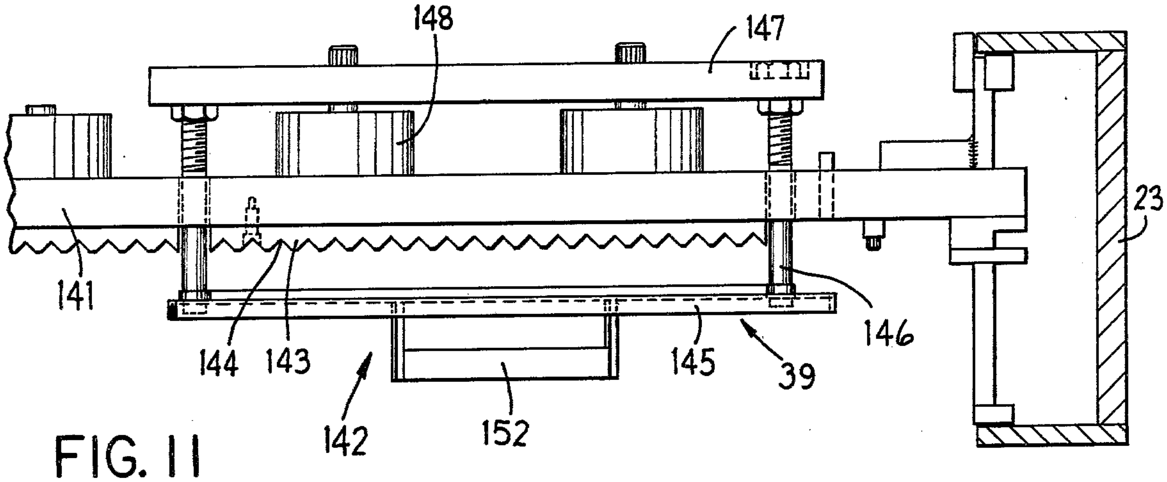
FIG. 11 is a top view of the clamping bar assembly shown in FIG. 10.
Figure 10:
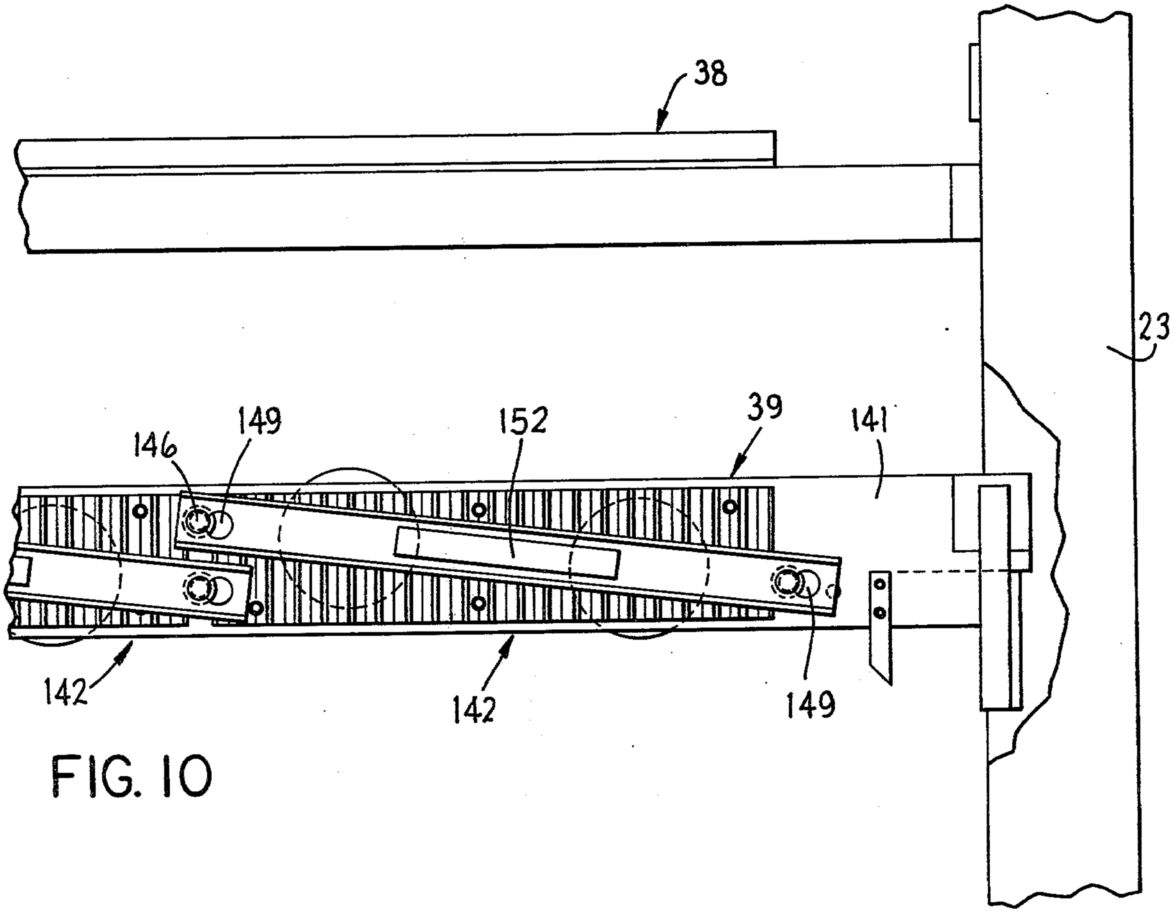
FIG. 10 is an enlarged, fragmentary, front elevational view of the clamping bar assembly.

The clamp bar assembly 39, as illustrated in FIGS. 10 and 11, includes an elongated mounting bar 141 which extends horizontally between the uprights 23–24 and has the opposite ends thereof connected to the chains 59. This mounting bar has three identical clamping bays 142 mounted thereon in side-by-side relationship.

Each clamping bay 142 includes a horizontally elongated clamping plate 143 fixed to and extending longitudinally of the mounting bar 141, which clamping plate has a plurality of V-shaped notches 144 extending vertically across the exposed side face thereof. The plurality of notches 144 are disposed in side-by-side relationship so that they are positioned in substantial vertical alignment with the openings which extend through the tube entry guide bar 36. The notches 144 are adapted to receive therein the element sheaths 11. A removable, elongated clamping rail 145 is positioned opposite the notched face of the clamping plate 143 and is supported on the ends of a pair of actuator pins 146, which pins are slidably supported on and extend transversely through the mounting bar 141. The opposite ends of the actuator pins 146 are fixed to a pressure bar 147 which extends in substantially parallel relationship to the mounting bar. A pair of double-acting fluid pressure cylinders 148 are connected between the mounting bar 141 and pressure bar 147 to cause transverse displacement of the pressure bar so that the clamping rail 145 can be moved toward and away from the notched clamping plate 143 to thereby clampingly engage or release the sheath elements 11 which are positioned therebetween.

The clamping rail 145 can be manually removed from the actuator pins 146, and for this purpose the clamping rail has keyhole-shaped openings 149 extending therethrough. The free ends of the actuator pins 146 have enlarged heads which can be inserted through the enlarged ends of the openings 149 so as to mount the rail on the pins, whereupon the rail can then be slidably moved sidewardly relative to the pins so that the enlarged heads overlap behind the narrow ends of the openings 149 to thereby fixedly hold the clamping rail on the actuator pins. The clamping rail has a handle 152 thereon to permit manual manipulation thereof.

In the illustrated embodiment, each clamping bay 142 is designed to permit the simultaneous clamping of twenty element sheaths 11, whereby the apparatus thus has a capacity of simultaneously clamping sixty such sheaths. The number of clamping bays, and the number of sheaths within each clamping bay, can obviously be varied in accordance with desired production requirements.

Receiver Bar Assembly

Figure 13:
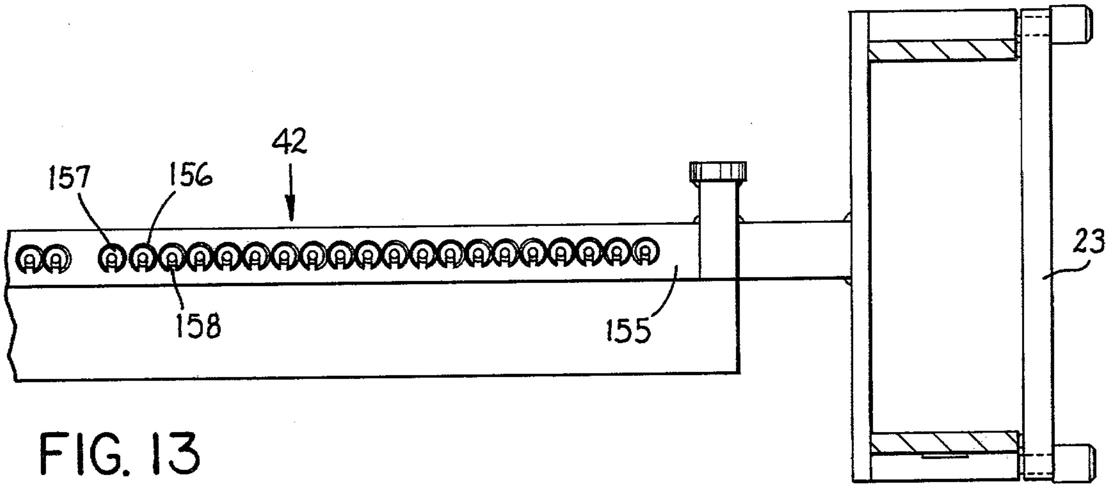
FIG. 13 is a plan view of the receiver bar assembly shown in FIG. 12.
Figure 12:
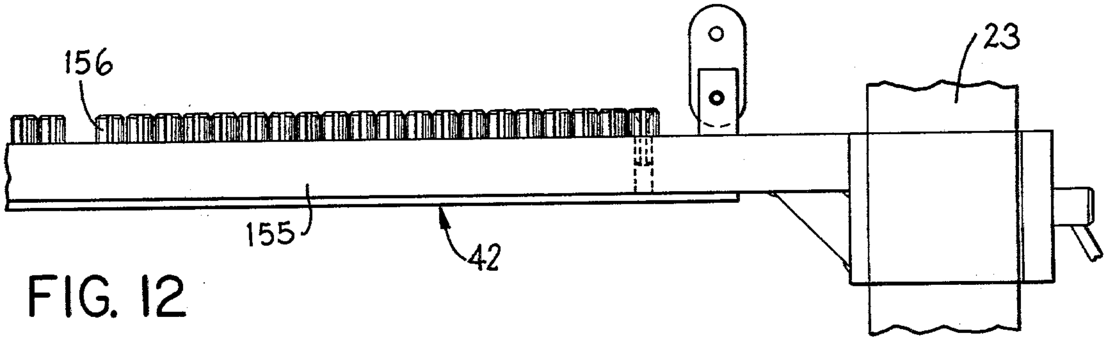
FIG. 12 is an enlarged, fragmentary, front elevational view of the receiver bar assembly.

Referring to FIGS. 12 and 13, the receiver bar assembly 42 includes an elongated receiver bar 155 which extends horizontally between and is fixedly connected to the uprights 23–24. This receiver bar has a plurality of cylindrical receivers 156 fixed thereto and projecting upwardly from the upper surface of the bar 155. The receivers are disposed within a row which extends longitudinally of the bar, with the receivers being located in groups which are aligned with the groups of notches 144 associated with each clamping bay 142. Each receiver 156 has a conical recess 157 (FIG. 17) which projects downwardly from the upper end of the receiver. A slot 158 opens radially from said conical recess through the outer periphery of the receiver.

OPERATION

The operation of the apparatus 20 will be described to insure a complete understanding thereof.

Figure 14:
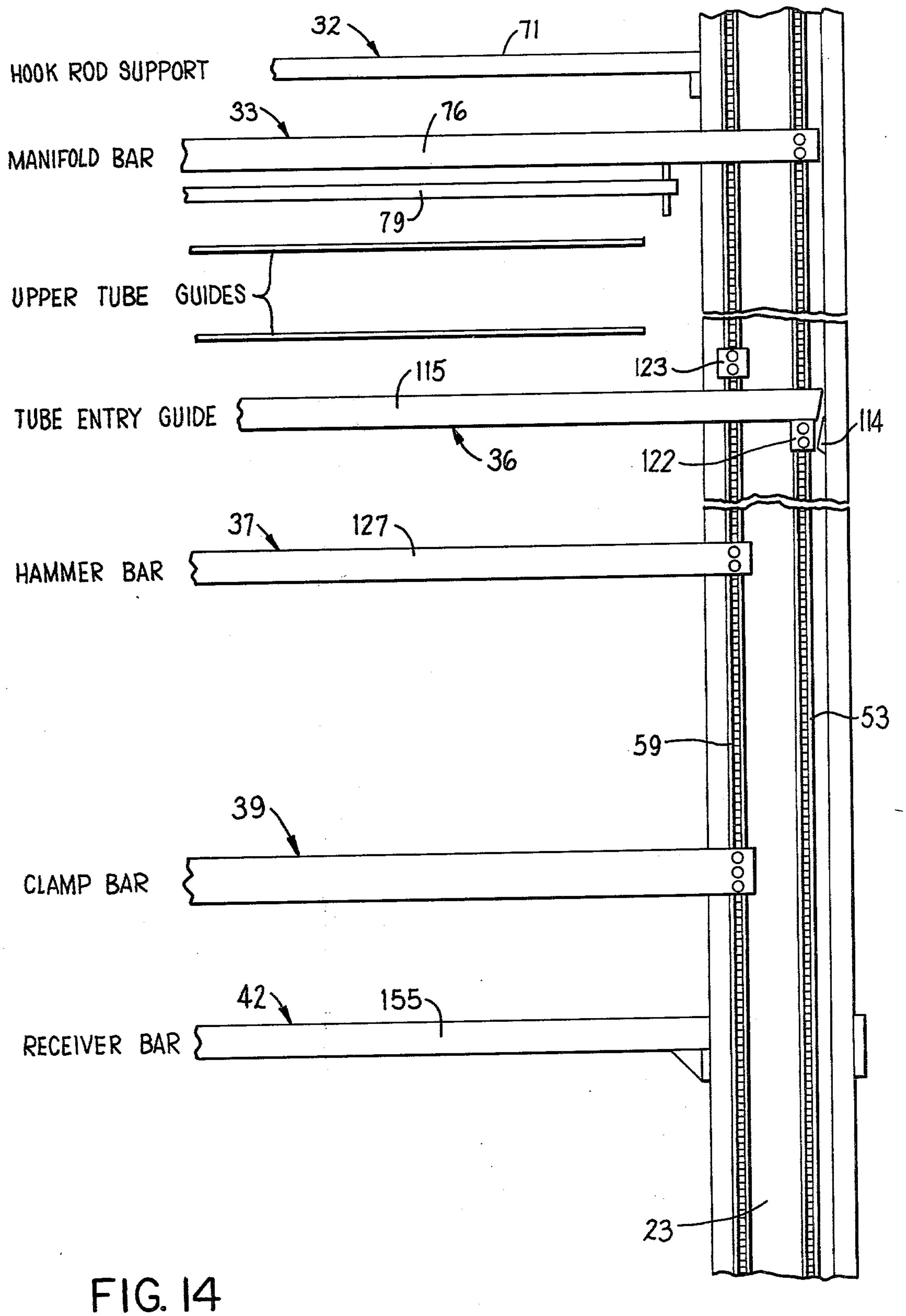
FIG. 14 is a diagrammatic elevational view illustrating one side of the apparatus and the cooperative relationship between the various assemblies and the driving chains.

To initiate a filling operation, the filling apparatus 20 is initially in the position substantially as illustrated in FIGS. 1, 7, 14 and 15. In this initial position of the apparatus, the manifold assembly 33 is disposed in its uppermost position shown in FIGS. 7, 14 and 15, in which position the manifold bar 76 is spaced upwardly a small selected distance above the valve block 79. Further, the tube entry guide bar 36 is positioned a small distance above its lowermost position, which lowermost position is defined by the locator elements 114, substantially as shown in FIGS. 7 and 14.

With the apparatus in the above-described initial position, the operator removes the clamping rail 145 associated with one of the clamping bays 142 to uncover the notches 144. Utilizing a conventional gripping tool, the operator then grips a plurality (here twenty) of sheaths 11 in parallel relationship, and then positions this plurality of sheaths 11 in upright relationship within the apparatus by inserting the sheaths into the notches 144 associated with the clamping bay and into the aligned notches or slots 128 associated with the hammer drive mechanism 129. These sheaths are then permitted to slide downwardly a limited extent so that the sheaths 11 seat within the conical recesses 157 formed on the receiver bar 155, as illustrated at the bottom of FIG. 15. The operator then manually repositions the clamping rail 145 on the actuator pins 146, and the pressure cylinders 148 are energized to move the clamping rail 145 inwardly into engagement with the sheaths 11 so that they are clamped within the notches 144.

The above procedure is repeated by the operator for each of the remaining clamping bays 142 until the apparatus is completely filled with sheaths 11.

Thereafter the manifold drive mechanism 34 is energized to move the pair of chains 53 and thus cause a limited lowering of the manifold assembly 33 and the tube entry guide bar 36 from the positions shown in FIGS. 14 and 15. During this initial lowering of the manifold assembly 33, the tube entry guide bar 36 is lowered synchronously therewith due to its being supported on the lifting blocks 122 (FIG. 14) secured to the chains 53. After the manifold assembly 33 and tube guide bar 36 have been lowered a small amount, the tube entry guide bar 36 engages the locating wedges 114 and hence is prevented from being lowered any further, the tube entry guide bar 36 thus being in its lowermost position, in which position the upper ends of the sheaths 11 are seated within the guide openings 118 formed in the tube entry guide bar substantially as illustrated in FIG. 16. At this stage, the inner and outer filler tubes 93–94 still have the lower ends thereof positioned within the tube entry guide bar 36. However, after stoppage of the tube entry guide bar 36, the manifold assembly 33 continues to move downwardly a limited extent into the position illustrated in FIG. 16, which causes the inner and outer filler tubes 93–94 to be pushed through the tube entry guide bar so as to project downwardly therepast partially into the sheath 11. When this lowermost position is reached, the manifold drive mechanism 34 is deenergized by appropriate limit switches, and at the same time the brake associated with drive mechanism 34 is energized to hold the chains 53 stationary.

The clamp bar drive mechanism 41 is then energized to cause movement of chains 59 so that the clamp bar assembly 39 and hammer bar assembly 37 are simultaneously lifted upwardly. This causes the sheaths 11 to be lifted away from the receiver bar 155 and, due to the engagement of the sheaths with the tube entry guide bar 36, the upward lifting of the sheaths causes a corresponding upward lifting of the tube entry guide bar 36 so as to permit the sheaths 11 to thus move upwardly in telescopic relationship to the filler tubes 93–94. This upward movement of the clamp bar assembly continues through a substantial vertical extent, and the lifting of the chains 59 causes the lifting blocks 123 (FIG. 14) mounted therein to engage the ends of the manifold assembly 33. At this time the brake associated with the manifold drive mechanism 34 is released to permit free movement of chains 53. The continued upward movement of the chains 59 and lifting blocks 123 then causes the manifold assembly 33 to be lifted upwardly from the position illustrated in FIG. 16 into the position illustrated in FIG. 17, which causes an upward lifting of the filler tubes 93–94 by an amount sufficient to enable the lower end of the hook rod 73 to project downwardly therefrom. When the manifold assembly 33 and clamp bar assembly 39 reach the upper positions shown in FIG. 17, in which position the sheath 11 is also totally telescoped upwardly over the filler tubes 93–94 so as to expose the lower end of the hook rod 73, the clamp bar drive mechanism 41 is stopped and braked.

With the apparatus positioned in this uppermost position illustrated in FIG. 17, the lower ends of the supply tubes 64 which extend downwardly from the main hopper 61 project through or are positioned closely adjacent the openings 109 formed in the cover 108 of the work hopper 106. By means of appropriate limit switches which are activated when in this uppermost position, the pressure cylinder 66 is energized to slidably displace the valve plate 65 into an open position, thereby permitting the granular insulating material to flow from the main hopper 61 downwardly through the supply tubes 64 into the work hopper 106, thereby filling the work hopper with a selected amount of granular material. This filling operation is terminated automatically or manually after a desired quantity of material is transferred to the work hopper, such as by use of a timer or the like, due to a reverse energization of the pressure cylinder 66 so as to close the valve plate 65.

Simultaneous with the above-described filling operation, the operator manually hooks the upper end of a resistance conductor 12 onto the lower end of each hook rod 73, substantially as illustrated in FIG. 17.

The clamp bar drive mechanism 41 is again energized, now in the reverse direction, to thereby drive the clamp bar drive assembly 39 downwardly, which downward movement continues until the lower ends of the sheaths 11 are disposed closely adjacent the plugs 14 as indicated by the dotted line position in FIG. 17. At this point, the lowering of the clamping bar assembly is momentarily stopped, and the operator manually pushes the plug 14 into the end of the respective sheath 11 to insure proper seating thereof. The lowering of the clamping bar assembly 39 is then resumed and continues until the clamping bar is returned to its original lowermost position as illustrated in FIG. 18, in which position the lower end of the sheath 11 is again reseated within the receiver 156. During this additional lowering, the conductor 12 is elastically extended due to a stretching of the coiled spring-like center portion.

During lowering of the clamping bar assembly from the position of FIG. 17 into the position of FIG. 18, the tube entry guide bar 36 is also simultaneously lowered back to its original position and thereby remains in engagement with the upper ends of the sheaths 11 at all times. In addition, the manifold assembly 33 also moves downwardly, as due to its own weight, with the lowering of the manifold assembly 33 being controlled by the downward movement of the lifting blocks 123. This lowering of the manifold assembly results in the filler tubes 93–94 being telescoped downwardly into the sheath 11 so that the lower ends of the filler tubes thus reach a position wherein they are diposed closely adjacent the lower end of the sheath, in telescopic surrounding relationship to the conductor 12, substantially as illustrated in FIG. 18.

When the lowermost position of FIG. 18 is reached, an appropriate limit switch is activated which, through conventional control circuitry, cause several control functions to be performed. First, the clamping bar drive mechanism 41 is deenergized. Second, the hammer drive mechanism 139 is energized to cause a low frequency shaking of the sheaths 11. Third, pressure cylinders 82 are energized to cause upward displacement of valve block 79 into contact with the manifold bar 76, whereby the flared mouth 103 of outer tube 94 surrounds the lower end of opening 96. Fourth, cylinder 113 is energized to slidably move the shut-off bar 112, which causes opening of the inclined feed passages 111 so that granular material can be fed from the work hopper 106 through the inclined feed passages 111 into the annular passage defined between the inner and outer feed tubes 93–94. The upward lifting of valve block 79 into contact with the manifold bar 76 also causes an upward lifting of the outer filler tube 94 relative to the inner filler tube 93 so that the annular valve member 97 is thus spaced downwardly from the outer filler tube, thereby opening the filler tube device. This latter-described positional relationship, as shown in FIG. 19, thus permits the granular insulating material to flow from work hopper 106 through the annular passage between inner and outer filler tubes 93–94, and past the valve member 97 into the sheath so as to fill the sheath 11 with said material in surrounding relationship to the conductor 12.

Simultaneous with the initiation of the sheath filling operation as described above, and as illustrated in FIG. 19, the manifold drive mechanisms 34 is energized to cause upward lifting of the manifold assembly 33. This causes the opened filler tube device 92 to be progressively lifted upwardly relative to the stationary sheath 11, during which upward lifting the granular material continues to flow through the opened filler tube assembly 92 to thereby fill the interior of the sheath 11 with granular material. The continued shaking or vibration of the sheath by the hammer mechanism, during the filling operation, compacts the granular material within the sheath in surrounding relationship to the conductor 12, whereby the conductor is thus properly centered and stationarily positioned within the sheath due to its being surrounded by the compacted granular material.

The upward lifting of the manifold assembly continues until the lower end of the filler tube device 92 is disposed adjacent the upper end of the sheath 11, at which time an appropriate limit switch causes the pressure cylinders 113 and 82 to be reversely energized to thereby close the shut-off bar 112 and lower the valve block 79 back into its original position relative to the manifold bar 76, which latter movement causes the lower end of outer feeder tube 94 to slide downwardly around the valve member 97 to close off the lower end of the feeder tube device.

The movement of the manifold assembly continues upwardly from the above-described position and in fact continues upwardly until the lifting blocks 122 again engage the tube entry guide bar 36 and cause same to be lifted upwardly a small distance out of engagement with the sheath 11. Further, the brass bar assembly is itself moved upwardly into its original uppermost position as illustrated in FIG. 20, which position corresponds to the original position of FIG. 15. When in this uppermost position, the brake associated with the manifold drive mechanism 34 is energized to hold the manifold assembly in this uppermost position.

The operator can then lock a conventional hand carrier onto the filled tubes associated with one bay, whereupon the clamping mechanism associated with that bay is then released to permit the filled tubes to be removed from the machine. This procedure is repeated for the other clamping bays until the machine is empty. The machine is then in condition to permit the initiation of a further filling cycle, which filling cycle again involves the same procedures and steps described above.

It will be recognized that the numerous control functions described above can be performed by utilizing limit switches and appropriate control circuitry, which control circuitry may assume numerous forms and the design of which is within the obvious capabilities of those skilled in this technology. Alternately, many of the functions can be manually controlled if desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for manufacturing sheathed heating elements, including means for supporting a plurality of sheaths to be filled with a particulate material, means for positioning a plurality of resistive elements individually within said sheaths, a plurality of sets of inner and outer concentric filling tubes defining an annular filling passage therebetween for said material, means for positioning said plurality of sets of concentric filling tubes within said sheaths in surrounding relationship to said resistance elements, means for feeding the material through said passage as said tubes are withdrawn from said sheath so as to concentrically position each said resistance element within its respective sheath and to fill said sheath from the bottom thereof with said material, and valve means for controlling the feeding of said material through said passage, comprising the improvement wherein said valve means is directly associated with said inner and outer concentric tubes and is movable between a first opened position permitting flow through said passage into said sheath and a second closed position for positively preventing flow from said passage into said sheath, said valve means including a valve member positioned adjacent the lower ends of said tubes and movable relative to at least one of said tubes between said opened and closed positions, said valve member being fixed to one of said tubes of each set and extending concentrically thereof, said valve member projecting radially relative to said one tube so as to substantially radially span said annular passage, said valve member having a surface positionable closely adjacent a peripheral surface on a lower portion of the other of said concentric inner and outer tubes adjacent the lower end thereof for defining said closed position, and actuating means for causing limited relative axial displacement between said concentric inner and outer tubes for relatively moving said one tube axially downwardly relative to said other tube to thereby position said valve member axially below and spaced downwardly from said lower portion of said other tube, thereby permitting flow from said annular passage into said sheath.

2. An apparatus according to claim 1, wherein said valve member comprises an annular part which is fixed to said one tube of each set and extends concentrically thereof.

3. An apparatus according to claim 2, wherein said annular valve member is fixed to said inner tube adjacent the lower end thereof and projects radially outwardly therefrom, said valve member comprising an annulus having a smoothly contoured configuration which projects radially inwardly and axially upwardly for merging with the external periphery of said inner tube.

4. An apparatus according to claim 1, wherein said filling tube positioning means comprises an elongated manifold means supported for vertical movement, said manifold means including an elongate manifold member having a plurality of said inner tubes fixedly mounted thereon and projecting downwardly therefrom in parallel relationship, an elongate valve control member movably supported on said manifold member for limited vertical movement of said valve control member toward and away from said manifold member, said plurality of outer filler tubes being fixed to said valve control member and projecting downwardly therefrom in parallel relationship and in concentric surrounding relationship to the inner filler tubes, and said actuating means causing relative vertical displacement between said manifold member and said valve control member so as to effect movement of the valve means between said opened and closed positions.

5. An apparatus according to claim 4, including hopper means mounted on said manifold means and containing therein a quantity of granular material, passage means formed in said manifold means for providing communication between said hopper means and said annular passage, and second valve means associated with said passage means for controlling the flow of material from said hopper means into said annular passage, said second valve means being movably supported on said manifold means.

6. An apparatus according to claim 5, wherein said valve member is fixed to and concentrically surrounds said inner tube adjacent the lower end thereof and projects radially outwardly through a radial distance substantially equal to the radial width of said annular passage, whereby when said valve member is positioned within said outer tube adjacent the lower end thereof, said valve member substantially closes the lower end of said annular passage.

7. In an apparatus for manufacturing a sheathed electrical heater of the type including an electrically conductive heating element disposed within a protective sheath which is filled with a granular insulator material, said apparatus including:

an upright frame;

a hook rod support fixed to said frame adjacent the upper end thereof, and an elongated hook rod fixed to said support and projecting vertically downward therefrom, said hook rod having means associated with the lower end thereof for permitting said electrically conductive heating element to be suspended therefrom;

a sheath support fixed to said frame adjacent the lower end thereof, said sheath support having means associated therewith for supportingly engaging the lower end of said protective sheath for supporting same in an upright position substantially in alignment with said hook rod, said sheath support being spaced downwardly a substantial distance below the lower end of said hook rod;

a clamp supporting structure being disposed vertically between said hook rod and sheath support and being vertically movably supported on said frame, and releasable clamping means mounted on said clamp supporting structure for clampingly engaging said protective sheath to said structure and for maintaining said protective sheath in an upright position;

first drive means connected to said clamp supporting structure for permitting selective vertical movement of said structure relative to said frame;

flow control means for permitting controlled flow of said insulator material into said protective sheath, said flow control means being vertically movably supported on said frame and positioned vertically between said hook rod support and said clamp supporting structure;

second drive means interconnected to said flow control means for permitting selected vertical displacement thereof relative to said frame;

said flow control means including a tube support vertically movably supported on said frame and interconnected to said second drive means, said tube support being disposed vertically between said hook rod support and said clamp supporting structure, and a feed filling tube device mounted on said tube support and projecting vertically downwardly therefrom in alignment with said hook rod;

said filling tube device including elongated inner and outer filling tubes positioned in concentric relationship to one another and defining an annular flow passage therebetween for said insulator material, said inner tube being at least partially telescoped over said hook rod and also being of a diameter capable of being telescoped over said electrically conductive heating element, said outer tube being of a diameter less than the internal diameter of said protective sheath so as to be telescopically receivable therein;

said filling tube device including valve means associated with said inner and outer tubes for regulating the discharge of insulator material from said annular flow passage, and means for effecting discharge of said material through said valve means when said filling tube device is telescopically received within said sheath in surrounding relationship to said conductive heating element to permit filling of said sheath with said material; and guide structure vertically movably supported on said frame and positioned vertically between said tube support and said clamp supporting structure, said guide structure having opening means extending vertically therethrough, said outer tube being slidably guided within said opening means with said filling tube device being adapted to have the lower ends of said tubes project downwardly below said guide structure;

the improvement comprising:

stop means fixedly associated with said frame and engageable with said guide structure for supporting said guide structure in a lowermost vertical position relative to said frame, said guide structure when in said lowermost vertical position being spaced upwardly above and out of engagement with the upper end of said protective sheath when the latter is supported on said sheath support;

said guide structure being freely movable vertically upwardly relative to said frame away from said lowermost vertical position, said guide structure being free of any direct connection to said first and second drive means, whereby vertical raising of said protective sheath by said clamping means causes the upper end of said sheath to engage said guide structure so that further raising of said sheath by said clamping means then effects a corresponding raising of said guide structure;

said guide structure also including tapered guide means provided on the lower side thereof and in concentric relationship to said opening means, said tapered guide means being positioned for guidably engaging the upper end of said protective sheath as it is vertically raised by said clamping means to center said sheath in alignment with said filling tube device and to supportingly maintain said protective sheath in said aligned relationship.

8. An apparatus according to claim 7, wherein said tube support comprises first and second supports each having one of said inner and outer tubes fixedly mounted thereon and projecting vertically downwardly therefrom, said first support being connected to said first drive means to permit vertical displacement of said first support relative to said frame, said second support being vertically movably supported directly on said first support, second stop means coacting between said first and second supports for permitting a preselected vertical displacement therebetween, and actuator means cooperating between said first and second supports for effecting said preselected vertical displacement therebetween;

said valve means including a valve member formed as an annulus and fixed to one of said filling tubes adjacent the lower end thereof and projecting radially from said one filling tube toward the other filling tube so as to substantially totally occupy and close said annular flow passage when said first and second supports are relatively at one end of said preselected vertical displacement so that said valve member and said other filling tube are in telescopic relationship so as to close said valve means, said valve member being positioned axially downwardly below the other end of said filling tubes when said first and second supports are at the opposite end of said preselected vertical displacement to thereby open said valve means.

9. An apparatus according to claim 8, including hopper means fixedly mounted on one of said first and second supports for containing therein a quantity of said insulator material, passageway means formed in said one support and providing communication between said hopper means and said annular flow passage, and second valve means movably mounted on said one support in association with said passageway means, said second valve means being movable between open and closed positions for controlling the flow of material from said hopper means through said passageway means.

* * * * *